2,804,472

PRODUCTION OF CYCLOHEXYLSULFAMATES BY AMIDE INTERCHANGE

Donald J. Loder, Wilmington, Del., assignor to E. I. du Pont de Nemours and Company, Wilmington, Del., a corporation of Delaware No Drawing. Application November 29, 1954, Serial No. 471,921

6 Claims. (Cl. 260—500)

This invention relates to the preparation of cyclohexylsulfamates by an amide interchange between an alkaline metal sulfamate and cyclohexylamine.

According to the present process an appropriate alkaline metal sulfamate is mixed with cyclohexylamine. The term "alkaline metal" is used to include both alkali metals such as sodium, potassium, and lithium; and alkaline earth metals such as calcium, barium, and magnesium.

The amide interchange proceeds according to the following reaction:

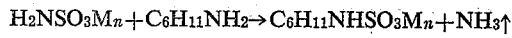

$$H_2NSO_3M_n + C_6H_{11}NH_2 \rightarrow C_6H_{11}NHSO_3M_n + NH_3\uparrow$$

where M is an alkaline metal as above described and where $n$ is the reciprocal of its valence.

The reaction as shown above is the theoretical reaction in an anhydrous system. If water is present it will compete for the metal and more or less of the metal oxide will form. Magnesium forms a very insoluble oxide and its formation will be favored. Magnesium oxide will separate from the liquid system. To the extent that there is excess cyclohexylamine the product then will contain cyclohexylammonium cyclohexylsulfamate.

The amount of cyclohexylamine used is comparatively unimportant. There should be at least a stoichiometric amount, and preferably there is used some excess, say 50 to 100 percent or more over that required. Instead of using so large an excess of cyclohexylamine, in addition to the amine there may be used inert high-boiling solvents such as kerosene, orthodichlorobenzene, and mixtures of bi-phenyl and diphenyl ether. As noted, an excess of cyclohexylamine is required if there is water present and especially if magnesium is the alkaline metal sulfamate.

It is generally preferred that the reactants be anhydrous or substantially anhydrous. As has been noted, the presence of water can cause the formation of a metal oxide corresponding to the alkaline metal used in the reacting sulfamate. In the case of magnesium this is particularly true and as to the magnesium there will often be an advantage in having enough water present to tie up all or a good part of the magnesium. Excesses of water over those which will combine with the metal are not preferred because of hydrolysis of the product.

The reactants can be brought together in any manner as, for example, by mixing the two reactants in the appropriate quantities. Either can be added to the other and the materials can be preheated to the reaction temperature. It is an advantage of the process that the manner of addition is comparatively indifferent.

The reaction must, of course, be conducted in a pressure reactor so that at the temperatures of the reaction the cyclohexylamine will remain in the liquid phase. Ammonia can be vented through a suitable release valve.

The temperature of the reaction should be high enough so that the amide interchange and the removal of ammonia proceeds with reasonable rapidity. On the other hand, the temperature should not be so high as to cause undue decomposition of the product. Generally, the temperature used should be below about 225° C. More specifically it will ordinarily be found desirable to conduct the amide interchange at a temperature between 160 and 190° C.

The rate of reaction will also depend upon the particular alkali metal sulfamate used in the reaction. Thus, when the reaction is conducted with a particular alkaline metal sulfamate the temperature can be selected so that the reaction will proceed to completion with reasonable rapidity.

The product can be separated from the reaction mixture in any convenient fashion. For example, it can be crystallized from the amine and then purified by crystallization from water. The amine can alternatively be separated as by azeotropic distillation or by extraction. A metal oxide or base can be added prior to distillation to aid in the removal of amine.

After an alkaline metal cyclohexylsulfamate has been prepared according to a process of the invention it can thereafter be converted to the cyclohexylsulfamate of another metal. Any convenient method of cation exchange can be used, such as the use of an ion exchanger or, relative solubilities permitting, selective precipitation.

In order that the invention may be better understood reference should be had to the following specific examples which are given in addition to those already generally indicated above:

Example 1

A charge consisting of 440 parts by weight of anhydrous cyclohexylamine and 116 parts by weight of anhydrous calcium sulfamate was introduced into a stainless steel pressure vessel equipped with an agitator.

Nitrogen was introduced into the vessel to a pressure of 25 p. s. i. g. Thereafter a slow nitrogen purge was passed through the vessel to an ammonia recovery system.

The charge in the pressure vessel was heated to 164° C. The progress of the reaction was followed by observing the amounts of ammonia liberated and collected in the scrubber.

After heating for one hour, 1.7 parts of ammonia, or 10 percent of the theoretical, had been liberated.

The temperature was raised to 173° C. After six more hours of heating, 6 parts of ammonia, or 35 percent of the theoretical, had been liberated.

The temperature was then raised to 179° C. and the reaction was continued for a total of 21 hours at which time 14 parts of ammonia, or 83 percent of theoretical, had been liberated.

The charge was cooled to 90° C. and the reactor vented.

Excess cyclohexylamine was removed by azeotropic distillation with water at atmospheric pressure. Water was added from time to time to maintain an approximately constant volume.

The product was drained and the reaction vessel was rinsed with water. The product and the rinse water were combined and were filtered at 60° C. to remove solids which amounted to 1.3 parts by weight, dry basis. The solids were analyzed as mainly calcium sulfate.

A portion of the solution was analyzed and was found to contain:

|  | Percent |
|---|---|
| Calcium cyclohexylsulfamate | 95.0 |
| Calcium sulfamate | 3.9 |
| Calcium sulfate | 0.5 |

The solution as prepared is a product which can be produced by processes of the invention. This solution can be concentrated and the cyclohexylsulfamate crystallized from it.

Instead of using calcium sulfamate in the charge, an equivalent amount of sodium, potassium, lithium or barium sulfamate can be used and the process can otherwise be conducted as above described.

Example 2

A charge consisting of 440 parts by weight of cyclohexylamine and 108.2 parts by weight of magnesium sulfamate was introduced into a stainless steel pressure vessel equipped with an agitator. The magnesium sulfamate analyzed 91.0% magnesium sulfamate, 8.2% water and 0.7% magnesium sulfate. This amount of water corresponds approximately to the monohydrate which was stable at 50° C. and 26 inches vacuum, 100 mm. Hg absolute pressure.

Nitrogen was introduced into the vessel to a pressure of 25 p. s. i. g. Thereafter a slow nitrogen purge was passed through the vessel to an ammonia recovery system.

The charge in the pressure vessel was heated to 165° C. The progress of the reaction was followed by observing the amounts of ammonia liberated and collected in the scrubber.

After maintaining the temperature at 165° C. for 3.5 hours, 15.1 parts of ammonia, or 89 percent of the theoretical, had been liberated.

The charge was cooled to 90° C. and the reactor vented.

Excess cyclohexylamine was removed by azeotropic distillation with water at atmospheric pressure. Water was added from time to time to maintain an approximately constant volume.

To one-fourth of the reaction product, 250 parts by weight of 1 N sodium hydroxide was added drop-wise while distilling at reduced pressure (170 mm. Hg) to remove cyclohexylamine. Distillation was continued until 250 parts of distillate consisting mainly of water with some amine was collected. The amine-free slurry was filtered to remove insolubles, mainly, magnesia. The filtrate was evaporated to dryness yielding 44.9 parts of a white solid which analyzed as essentially pure sodium cyclohexylsulfamate. This corresponds to a 98% overall yield of sodium cyclohexylsulfamate from magnesium sulfamate.

This application is a continuation-in-part of my application Serial Number 442,423 filed July 9, 1954, and now abandoned.

I claim:

1. In a process for making cyclohexylsulfamates, the steps comprising mixing at least a stoichiometric amount of cyclohexylamine with an alkaline metal sulfamate and heating to effect amide interchange.

2. In a process for making cyclohexylsulfamates, the steps comprising mixing at least a stoichiometric amount of cyclohexylamine with an alkaline metal sulfamate and heating to a temperature below 225° C. to effect amide interchange.

3. In a process for making cyclohexylsulfamates, the steps comprising mixing at least a stoichiometric amount of cyclohexylamine with an alkaline metal sulfamate and heating to a temperature between 160 and 190° C. to effect amide interchange.

4. In a process for making calcium cyclohexylsulfamate, the steps comprising mixing at least a stoichiometric amount of cyclohexylamine with calcium sulfamate and heating to a temperature between 160 and 190° C.

5. In a process for making sodium cyclohexylsulfamate, the steps comprising mixing at least a stoichiometric amount of cyclohexylamine with sodium sulfamate and heating to a temperature between 160 and 190° C.

6. In a process for making a cyclohexylsulfamate, the steps for comprising mixing at least a stoichiometric amount of cyclohexylamine with magnesium sulfamate and heating to a temperature between 160 and 190° C.

References Cited in the file of this patent

UNITED STATES PATENTS 2,275,125    Andrieth et al. _____ Mar. 3, 1942